United States Patent Office 3,227,745
Patented Jan. 4, 1966

3,227,745
THE USE OF A TERTIARY ALKANOL SOLVENT IN THE TERTIARY PHOSPHINE CATALYZED DIMERIZATION OF ALKYL ACRYLATES
James D. McClure, San Francisco, Calif., assignor to Shell Oil Company, New York, N.Y., a corporation of Delaware
No Drawing. Filed May 28, 1963, Ser. No. 283,679
8 Claims. (Cl. 260—485)

This invention relates to an improved process for the production of acrylate ester dimers. More particularly, it relates to an improved process for the dimerization of alkyl esters of acrylic acid to produce dialkyl 2-methyleneglutarate.

The tendency for acrylate esters to undergo polymerization is established in the art. Such materials are so readily polymerizable that great difficulty is attendant to processes for the production of acrylate dimers wherein the formation of polymer must be minimized. Such processes generally require low temperatures and carefully controlled reaction conditions, and yet produce low yields of dimer product, despite high conversions of acrylate ester reactant. For example, U.S. Patent 3,074,999 to Rauhut et al. describes the dimerization of lower alkyl acrylates in acetonitrile solution in the presence of tertiary phosphine catalyst. Reaction temperatures employed are from about 20° C. to about 50° C. and reaction times on the order of days are required to obtain yields of dimer product on the order of 50%. It would be of considerable advantage to provide an improved process for the production of dialkyl 2-methyleneglutarate wherein higher yields of product are obtained.

It is therefore an object of this invention to provide an improved process for the production of acrylate ester dimers. A more particular object is to provide a process whereby dialkyl 2-methyleneglutarate is produced in high yield and in comparably short reaction time.

It has now been found that these objects are accomplished by the process of dimerizing alkyl esters of acrylic acid in the presence of a tertiary phosphine catalyst in an alcoholic solution.

The acrylate ester reactants of the present invention are esters of acrylic acid and monohydroxylic alcohols. Preferred esters contain moieties of alkyl alcohols having from 1 to 8 carbon atoms. Although the process of the invention is operable with acrylate esters of secondary and tertiary alkanols, best results are obtained when the alkanol moiety of the acrylate ester is that of a primary alkanol, preferably a primary straight chain alkanol. Illustrative of such preferred acrylate ester reactants are methyl acrylate, ethyl acrylate, n-propyl acrylate, n-butyl acrylate, n-hexyl acrylate and n-octyl acrylate. Optimum utilization of the process of the invention is obtained when the alcohol moiety of the acrylate ester has from 1 to 2 carbon atoms, i.e., when methyl acrylate and ethyl acrylate are employed.

The dimerization is conducted in liquid phase solution. Although solvents that are liquid at reaction temperature and pressure and are substantially inert towards the acrylate ester reactant are in general operable in the process of the invention, substantial benefits are obtained when the solvent employed is an alcohol, particularly an aliphatic, saturated, monohydroxylic alcohol having up to 10 carbon atoms. The role of a hydroxylic solvent in the process of the invention is not clearly understood. Without wishing to be bound by any specific theory, it is believed that alcoholic solvents, in addition to serving as reaction media, participate in the reaction process by supplying available hydrogen ions which serve to minimize the production and propagation of the reactant chains that result in the production of polymeric product. The use of hydroxylic solvents enables the dimerization process to be conducted at temperatures higher than when aprotic solvents are employed, and yet retain greater selectivity for dimerization and retard the greater tendency for polymer formation normally associated with reactions of polymerizable materials at elevated temperatures. At the higher reaction temperatures made possible by the use of hydroxylic solvents in the process of the invention, more rapid rates of reaction are observed and shorter reaction times may be employed, and yet obtain equivalent or superior yields of dimer product.

However, primary alcohols, and to a lesser extent secondary alcohols, have a tendency to undergo addition across the olefinic linkage of the unsaturated ester reactant, and although primary and secondary alcohols, e.g., methanol, ethanol, isopropanol, sec-butanol, benzyl alcohol and the like may be employed as reaction solvents, the advantages obtained by the use of these alcoholic solvents are somewhat offset by the side reaction of solvent addition. Best results are obtained when the alcohol solvent employed is a tertiary hydrocarbon alcohol. The use of such tertiary hydrocarbonols combines the advantages of an alcoholic solvent with a lessened tendency for solvent addition to the reactant molecule. Thus, tertiary hydrocarbonols are substantially inert with regard to solvent addition, but are active in the sense of tending to retard polymerization of reactant molecules. Suitable tertiary hydrocarbonols include tert-butyl alcohol, tert-amyl alcohol, methyl diethyl carbinol, phenyl dimethyl carbinol, phenyl ethyl methyl carbinol, triethylcarbinol and the like. Preferred tertiary hydrocarbonols are tertiary alkanols, and most preferred as solvent for the process of the invention is tertiary butyl alcohol.

The reaction solvent is generally employed in molar amounts equivalent to or in excess over the acrylate ester reactant, although molar ratios of alcohol solvent to acrylate ester reactant of from about 0.1:1 to about 20:1 are satisfactory, and higher or lower ratios may be employed. Molar ratios of alcohol solvent to acrylate ester from about 1:1 to about 10:1 are preferred.

The alcohol solvent may be employed as a single substance or may be employed as a mixture with inert diluents such as ethers, esters or hydrocarbons. Although the presence of an inert diluent appears to have no detrimental effect, neither does it appear to have any substantial benefit, and in the preferred modification of the process of the invention, the alcohol solvent is substantially free from other diluents.

The dimerization is conducted in the presence of a tertiary phosphine catalyst. Suitable tertiary phosphine catalysts have from 3 to 60 carbon atoms in the organic portions of the molecule, and include compounds represented by the formula $R_3P$ wherein R independently is alkyl including aralkyl, preferably having from 1 to 12 carbon atoms, or aryl including alkaryl, preferably having from 6 to 10 carbon atoms; as well as tertiary diphosphines represented by the formula RRP—R'—PRR wherein R has the previously stated significance and R' is a divalent radical corresponding to R. Largely from economic considerations, preferred tertiary phosphines contain R groups that are hydrocarbyl, that is, contain only carbon and hydrogen atoms, as illustrated by alkyl R groups such as methyl, ethyl, propyl, isopropyl, n-butyl, tert-butyl, hexyl, decyl, lauryl, benzyl and β-phenylethyl radicals; and aryl R groups such as phenyl, naphthyl, xylyl and tolyl radicals. Exemplary tertiary phosphine catalysts containing these preferred R groups are triethylphosphine, tri - n - butylphosphine, dimethylbenzylphosphine, propylhexylnonylphosphine, triphenylphosphine, tri-p-tolylphosphine, 3 - (dipropylphosphino)propyldipropylphosphine, 2 - (dibutylphosphino)ethyldibutylphosphine, and bis(diphenylphosphine)methane.

Some tertiary phosphines are available, however, wherein the groups attached to the trivalent phosphorus atom are substituted hydrocarbyl, and such phosphines may also serve as catalysts in the process of the invention. Illustrative of tertiary phosphines containing substituted hydrocarbyl substituents are tertiary phosphines containing carboalkoxyalkyl substituents, e.g., (2-carbomethoxyethyl)diethylphosphine, (3-carbohexoxypropyl)diphenylphosphine, and di(2 - carbethoxyethyl)butylphosphine; tertiary phosphines containing cyanoalkyl substituents, such as (2-cyanoethyl)diphenylphosphine, di(2-cyanoethyl)butylphosphine and tri(3-cyanopropyl)phosphine; tertiary phosphines containing dialkylaminohydrocarbyl substituents including (2 - dimethylaminoethyl)dibutylphosphine, tri(3-dipropylaminopropyl)phosphine, di(3-diethylaminobutyl)benzyl phosphine, tri(p - dimethylaminophenyl)phosphine, and di(p-dipropylaminophenyl)ethylphosphine; tertiary phosphines containing internal oxahydrocarbon substituents such as tri(p-methoxyphenyl)phosphine, di - (p - ethoxyphenyl)phenylphosphine, (2-methoxyethyl)diethylphosphine and tri(3 - propoxypropyl)phosphine; and tertiary phosphines containing halohydrocarbyl substituents such as tri(2-chloroethyl)phosphine, tri(4-trifluorophenyl)phosphine and di-n-butyl-(3-chlorobutyl)phosphine.

Also suitable as catalysts in the process of the invention are catalysts wherein the tertiary phosphine moiety is contained within a metal complex, such as a modified metal carbonyl complex of a transition metal, particularly a complex of cobalt or other transition metal of Group VIII of the Periodic Table, e.g., bis(tri-n-butylphosphine)-dicobalt hexacarbonyl, [2-(diethylphosphino)ethyldipropylphosphine] dicobalt hexacarbonyl and the like. Most preferred as catalysts for the process of the invention are trialkyl phosphines.

Regardless of the tertiary phosphine employed, only catalytic amounts are required. In general, amounts of catalyst from about 0.0001 mole to about 0.1 mole per mole of acrylate ester are satisfactory, although catalyst concentrations from about 0.001 mole to about 0.01 mole per mole of acrylate ester are preferred.

The dimerization process is conducted in an inert atmosphere, e.g., under an inert gas such as nitrogen, helium, or argon, and is preferably conducted under substantially anhydrous conditions. Although small amounts of moisture, e.g., up to 1–2%, can be tolerated without losing the advantages of the process of the invention, the yields of product are somewhat lower when moisture is present. The reactants, solvent and catalyst are customarily charged to an autoclave or similar reactor, sealed, and heated to reaction temperature and maintained at that temperature during reaction. Typical reaction times are from about 1 to about 12 hours. Suitable reaction temperatures will be dependent upon the particular acrylate ester, solvent and catalyst employed. While the dimerization process may be conducted at temperatures as low as 0° C., utilization of alcoholic solvents allows unexpectedly high reaction temperatures to be employed with attendant increase in reaction rate and yet retain selectivity for dimerization without excessive formation of polymer. Temperatures as high as about 190° C. are satisfactory, although temperatures from about 100° C. to about 150° C. are preferred, with best results obtained at temperatures from about 110° C. to about 140° C. The dimerization may be conducted at atmospheric, subatmospheric or superatmospheric pressure, although pressures that are substantially atmospheric are to be preferred. Advantageous use is made of the pressure generated by the reaction mixture when heated to reaction temperature in a sealed reactor. Subsequent to reaction, the reactor is cooled and opened, and the product is recovered by conventional means, as by fractional distillation of the product mixture following removal of solvent and unreacted starting material which may then be recycled. Best results are obtained when the catalyst is deactivated, as by neutralization with an acid, e.g., acetic acid, prior to distillation of the reaction mixture.

The products of the process of the invention are dialkyl 2-methyleneglutarates, as illustrated by dimethyl 2-methyleneglutarate, diethyl 2-methyleneglutarate, dibutyl 2-methyleneglutarate, dioctyl methyleneglutarate and dihexyl 2-methyleneglutarate. The products, which may be considered to be $\alpha$-($\beta$-carboalkoxyethyl)-substituted acrylate esters, find utility as monomers from which useful polymeric materials can be prepared, or alternatively they may be reacted with other olefinic or acrylic materials to produce useful co-polymers.

To further illustrate the improved process of the present invention, the following examples are provided. It should be understood that they are not to be regarded as limitations, as the teachings thereof may be varied as will be understood by one skilled in this art.

*Example I*

A solution of 40 g. of ethyl acrylate, 1.0 g. of tri-n-butylphosphine and 0.2 g. of hydroquinone in 80 g. of tertiary butyl alcohol was placed in a glass-lined reactor under nitrogen and maintained at 120–130° C. for 7.5 hours. Solvent and unreacted starting material were removed from the product mixture by distillation at reduced pressure and the residual liquid fractionally distilled to afford 12.0 g. of diethyl 2-methyleneglutarate, B.P. 71–74° C. at 0.1–0.2 mm., which represents a yield of 88% based upon a conversion of 34%.

*Example II*

A solution of 240 g. of ethyl acrylate, 6 g. of tri-n butylphosphine, and 1 g. of hydroquinone in 480 g. of tert-butyl alcohol and 60 ml. of benzene was maintained 126±2° C. for 8 hours. The product mixture was filtered to remove 0.3 g. of insoluble material, and the solvent and unreacted ethyl acrylate (135 g.) were removed by distillation at reduced pressure. Distillation of the residual liquid gave 93 g. of diethyl 2-methyleneglutarate, B.P. 78–83° C. at 0.2–0.3 mm., which represented a 90% yield based upon a 44% conversion of ethyl acrylate.

*Example III*

A solution of 40 g. of methyl acrylate and 1 g. of tri-n-butylphosphine in 80 g. of tert-butyl alcohol and 10 ml. of benzene was maintained, under nitrogen, at 130±2° C. for 7 hours. No insoluble material was formed. Subsequent to removal of solvent and unreacted starting material, fractional distillation of the residual liquid gave 8.8 of dimethyl 2-methyleneglutarate, B.P. 56–59° C. at 0.1–0.2 mm. This represented a 74% yield based upon a conversion of 30%.

*Example IV*

A solution of 40 g. of ethyl acrylate, 0.05 g. of hydroquinone and 1 g. of tri-n-butylphosphine in 80 g. of tert-butyl alcohol were placed in a glass-lined reactor and heated under nitrogen for 8 hours at 125–130° C. The reaction mixture was then neutralized with 0.3 g. of acetic acid and the solvent and unreacted starting material was removed by distillation. The residual liquid was fractionally distilled to give 10.3 g. of diethyl 2-methyleneglutarate, B.P. 72–75° C. at 0.25 mm., which represented a 91% yield based upon a conversion of 30%.

*Example V*

To illustrate the advantages obtained when hydroxylic solvents are employed in the process of the invention, comparative experiments were conducted using tertiary butyl alcohol and also using a non-hydroxylic solvent known to be suitable for the dimerization process. In each case, the procedure of Example IV was followed, except where noted, using 40 g. of ethyl acrylate, 80 g. of solvent, and employing a reaction temperature of 125–130° C. for 8 hours. The reuslts are tabularized below.

| Solvent | Percent Conversion Ethyl Acrylate | Percent Yield of Dimer | Comments |
|---|---|---|---|
| Acetonitrile | 20 | 64 | } No acetic acid neutralization. |
| Tert-butyl alcohol | 34–50 | 88–90 | |
| Acetonitrile | 25 | 73 | |
| Tert-butyl alcohol | 30 | 91 | Example IV. |

In each case when acetonitrile was employed as solvent, a second volatile fraction, B.P. 135–145° C. at 0.5 mm., was observed when the product was fractionally distilled. This fraction, amounting to about 10–15% of the product, was assumed to be trimer or low polymer of ethyl acrylate. The higher boiling fraction was not observed when tertiary butyl alcohol was employed as solvent.

*Example VI*

When butyl acrylate is dimerized in the presence of triethylphosphine in tert-amyl alcohol solution, good yields of dibutyl 2-methyleneglutarate are obtained.

*Example VII*

When hexyl acrylate is dimerized in tertiary butyl alcohol solution in the presence of (dipropylphosphino) methyldiphenylphosphine, good yields of dihexyl 2-methylenegultarate are obtained.

I claim as my invention:

1. In the process for the dimerization of alkyl acrylate wherein the alkyl moiety is that of an alkanol of from 1 to 8 carbon atoms to the corresponding dialkyl 2-methyleneglutarate in the presence of from about 0.0001 mole to about 0.1 mole per mole of said alkyl acrylate of a tertiary organic phosphine catalyst, in liquid-phase solution under substantially anhydrous conditions, the improvement which comprises using as the solvent a tertiary alkanol of from 1 to 10 carbon atoms, the molar ratio of said alkanol to said alkyl acrylate being from about 1:1 to about 10:1, in an inert atmosphere at a temperature of from about 100° C. to about 150° C.

2. The process of claim 1 wherein the tertiary alkanol is tertiary butyl alcohol.

3. The process of claim 1 wherein the tertiary organic phosphine catalyst is trialkylphosphine wherein each alkyl is alkyl of from 1 to 12 carbon atoms.

4. The process of claim 3 wherein the alkyl moiety of said alkyl acrylate is that of alkanol of from 1 to 2 carbon atoms.

5. The process of claim 4 wherein the catalyst is tri-n-butylphosphine.

6. The process of claim 4 wherein the catalyst is triethylphosphine.

7. The process of claim 4 wherein the tertiary alkanol is tertiary butyl alcohol.

8. The process of claim 4 wherein the tertiary alkanol is tertiary amyl alcohol.

References Cited by the Examiner

UNITED STATES PATENTS 3,074,999  1/1963  Rauhut et al. _____ 260—485

FOREIGN PATENTS 521,346  1/1956  Canada.

LORRAINE A. WEINBERGER, *Primary Examiner.*

LEON ZITVER, *Examiner.*

I. R. PELLMAN, *Assistant Examiner.*